United States Patent [19]

Karthaus et al.

[11] Patent Number: 5,083,440
[45] Date of Patent: Jan. 28, 1992

[54] SOLVENT CONDENSER ARRANGEMENT FOR A SOLVENT RECOVERY APPARATUS

[75] Inventors: Michael Karthaus, Neuss; Klaus Hermanns, Hünxe, both of Fed. Rep. of Germany

[73] Assignee: Herco-Kuhltechnik & Co GmbH, Werk Hattingen, Fed. Rep. of Germany

[21] Appl. No.: 580,792

[22] Filed: Sep. 11, 1990

[30] Foreign Application Priority Data

Sep. 11, 1989 [DE] Fed. Rep. of Germany ....... 3930239

[51] Int. Cl.$^5$ .................. F25D 21/10; B01D 59/08
[52] U.S. Cl. .............................. 62/282; 55/82; 34/73; 62/234
[58] Field of Search ............ 62/155, 234, 82, DIG. 2, 62/282; 34/73; 55/82

[56] References Cited

U.S. PATENT DOCUMENTS

| 2,867,988 | 1/1959 | Brandt | 62/234 X |
| 3,067,590 | 12/1962 | Wood, Jr. | 62/DIG. 2 |
| 4,469,720 | 9/1984 | Morris | 34/73 |

FOREIGN PATENT DOCUMENTS 2337055 12/1982 Fed. Rep. of Germany .
8816558 8/1988 Fed. Rep. of Germany .

OTHER PUBLICATIONS

U.S. Ser. No. 580,787-Sep., 1989.

*Primary Examiner*—William E. Wayner
*Attorney, Agent, or Firm*—Ratner & Prestia

[57] ABSTRACT

A solvent condenser arrangement for a solvent recovery apparatus comprises at least two solvent condensers of which one is in operation at a time, while the other is defrosted; the at least two solvent condensers are supplied via a pump from a refrigerant container under vaporization pressure.

8 Claims, 2 Drawing Sheets

SOLVENT CONDENSER ARRANGEMENT FOR A SOLVENT RECOVERY APPARATUS

BACKGROUND OF THE INVENTION

1. Field of the Invention

The present invention relates to a solvent condenser arrangement for a solvent recovery apparatus.

2. Description of the Prior Art

In many industrial processes, for instance, in the drying of articles such as audio tapes or video tapes, solvent vapors are formed which have to be collected and recovered so that they do not enter the atmosphere but can be recycled. Moreover, in such a recovery apparatus usually the inert gas, in general, nitrogen is processed, which serves the purpose of screening the manufacturing apparatus, where the solvent vapors are formed, against the ambient air. In order to prevent such solvent vapors from leaving this apparatus all openings, in general, the inlet and the outlet of this apparatus are provided with transfer chambers which are constantly flushed with the inert gas, in particular, nitrogen to avoid any contact of the atmosphere in the apparatus with the outside air and thus, in particular, emission of the solvent vapors.

Hence, a modern solvent recovery apparatus usually comprises two circuits partially independent of each other, i.e.

an inert gas circuit from which the solvent is condensed, and a cryogenic part which supplies the transfer chambers of the manufacturing apparatus, for instance, a drier.

The basic construction of such a recovery apparatus for the supply of a drier can be seen from FIG. 1. The drier shown there is continuously or charge-wise charged with the articles to be dried, e.g. video tapes or audio tapes and is provided with transfer chambers 1a, 1b at its inlet and outlet, which are supplied with nitrogen and therefore form a protective curtain between the solvent atmosphere in the inside of the drier 1 and the ambient air.

The solvent-charged nitrogen present in the drier 1 is supplied to a heat exchanger 2 of the solvent recovery apparatus where this gas mixture is precooled. High-boiling components are condensed in the heat exchanger 2 in accordance with the vapor pressure curve. Moreover, the heat exchanger 2 serves the purpose of heat recovery.

The precooled solvent/nitrogen mixture not containing the high-boiling components is supplied from the heat exchanger 2 into a condenser, in which the main portion of the solvent is condensed against external refrigeration. The latter is supplied by the vaporizer 3 of a refrigerating machine 4.

From the vaporizer 3, which also serves as condenser, the two-phase mixture consisting of liquid solvent/purified nitrogen is supplied into a solvent separator 5, where the solvent is separated from the nitrogen; the latter flows from the separator 5 back into the heat exchanger 2 and is heated there in heat exchange with the gas mixture consisting of solvent/nitrogen drained from the drier 1. A fan 6 sucks off the nitrogen from the heat exchanger 2 and returns it into the drier 1.

The recovered solvent present in the separator 5 is intermediately stored in a container 7 and usually repumped to the storage tank for the solvent by means of a pump (not shown).

To prevent oxygen from penetrating into the drier 1 and the solvent from leaving the drier 1 nitrogen is supplied to the transfer chambers 1a, 1b of the drier to produce a positive flow in both directions, namely to the outside of the transfer chambers (the ambient air) and to the inside towards the drier 1.

The flushing nitrogen required therefor is taken partially from the recirculation nitrogen and partially from a tank 8. To guarantee a positive flow from the transfer chambers 1a, 1b into the drier 1 nitrogen is permanently withdrawn from the nitrogen circuit downstream of the separator 5; in accordance with the vapor pressure curve this withdrawn nitrogen, however, still contains so much solvent that this gas mixture may not yet be dissipated into the environment. For this purpose, the gas mixture is heavily supercooled in a cryogenic apparatus 9 and thus purified of the solvent to such a degree until the solvent portion of this gas mixture lies below the regulatory values, so that it is suited for the supply of the transfer chambers. The refrigeration necessary for this purpose is taken from the nitrogen which is used in addition for the flushing of the transfer chambers.

After heating in another heat exchanger 10 the nitrogen passes from the cryogenic apparatus to the transfer chambers 1a, 1b.

In such a solvent recovery apparatus frequently temperatures of −25° C. and below are necessary to condense the solvents used. In this connection, difficulties may arise in the vaporizer 3 of the refrigerating machine, which vaporizer serves as solvent condenser, if a solvent having a high melting point or a solvent mixture comprising components having high melting points have to be condensed. This leads to the sublimation of the components with high melting points and thus to closing of the solvent circuit in the vaporizer 3. The solvent very frequently contains water as well, which sublimes on the cold surfaces of the vaporizer 3 and thus leads to icing of the vaporizer 3.

SUMMARY OF THE INVENTION

Therefore, the invention has as its object to provide a solvent condenser arrangement of the specified category, in which the disadvantages mentioned in the above do not occur. In particular, a solvent condenser arrangement is to be proposed, in whcih operating troubles due to closing of the solvent circuit by crystallizing components are securely avoided.

According to the invention this is achieved by providing at least two solvent condensers of which one is in operation at a time, while the other one is defrosted and by alternately supplying the solvent condensers via a pump from a refrigerant container under vaporization pressure.

Expedient forms of embodiment are defined by the features of the subclaims.

The advantages achieved by the invention are based on the use of at least two separate solvent condensers which are operated alternately, that is one after the other, so that always one solvent condenser is operated and the other one can be defrosted in order to thus avoid closing of the solvent circuit by crystallization of components of the solvent.

DESCRIPTION OF THE PREFERRED EMBODIMENT

Figure 1:
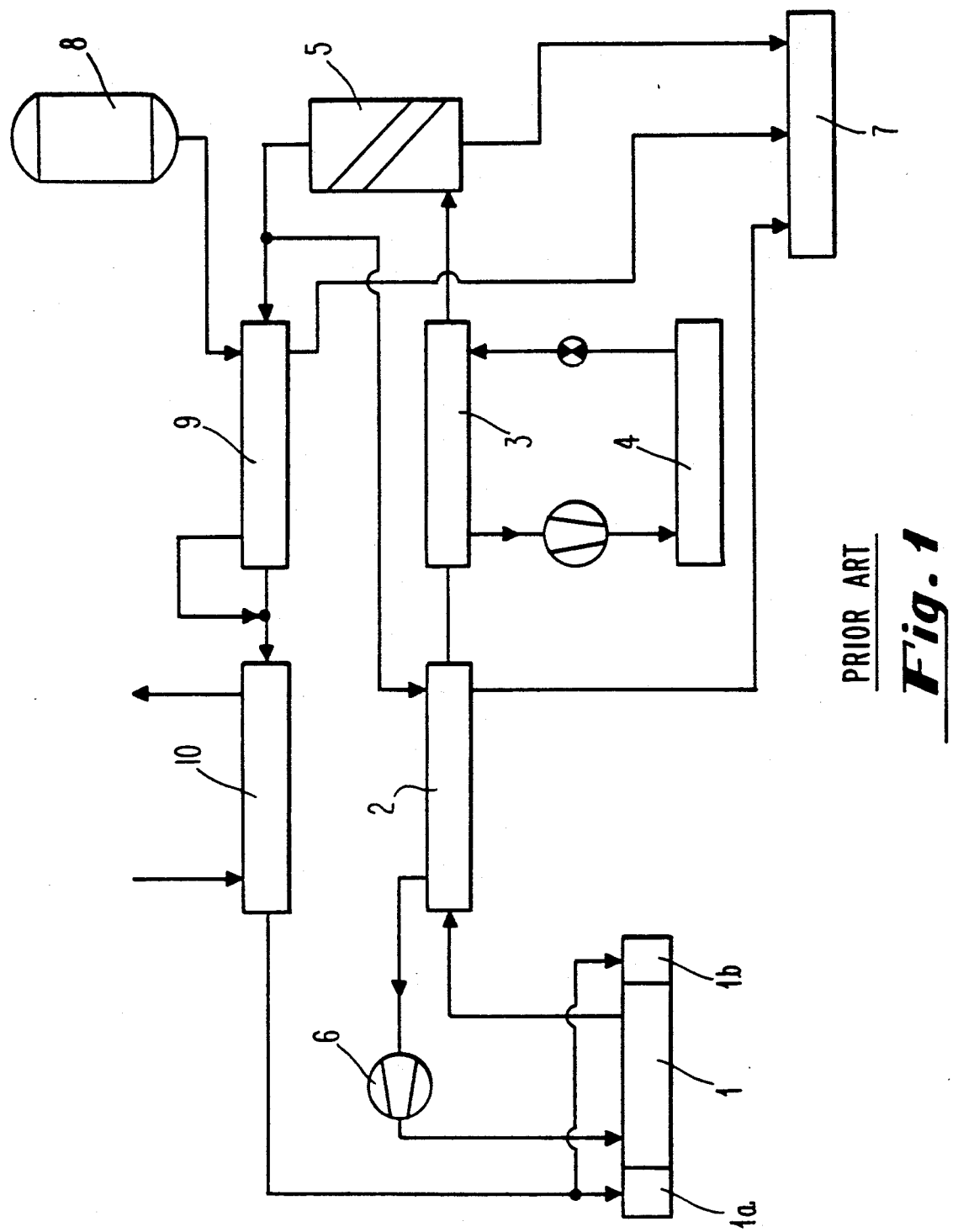
FIG. 1 is a schematic showing of the prior art solvent recovery system.
Figure 2:
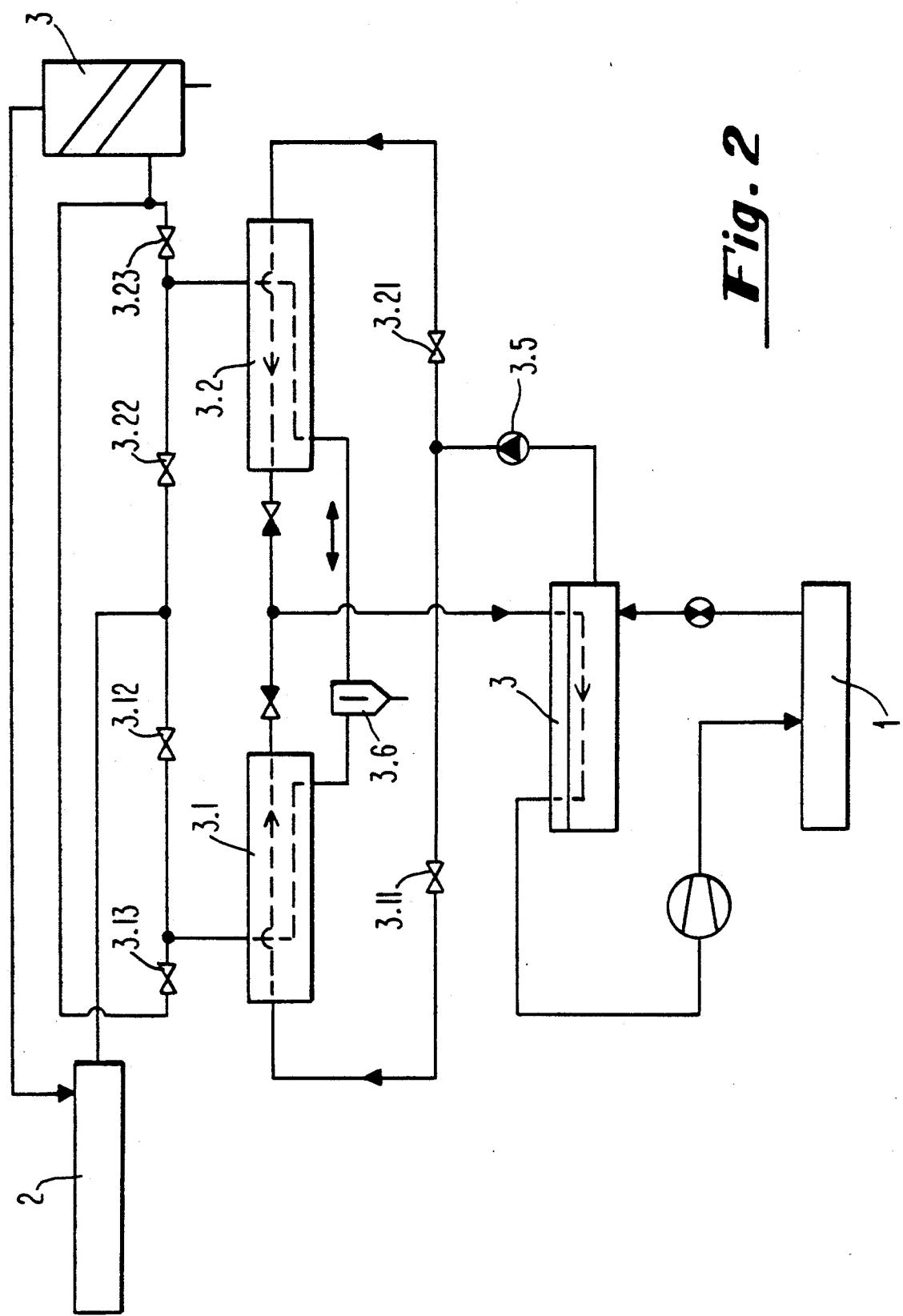
FIG. 2 is a schematic showing of the improved solvent recovery system.

The invention is described in more detail on the basis of an embodiment by referring to the enclosed FIG. 2 which shows a schematic view of the structure of such a solvent recovery apparatus. As far as possible, the reference numerals used are the same as in FIG. 1, so that the corresponding components do not have to be described one more time. The drier 1 comprising the transfer chambers 1a, 1b and the nitrogen supply is not shown again in FIG. 2.

In the solvent recovery apparatus according to FIG. 2 the mixture consisting of solvent/nitrogen reaches a circuit which can be interrupted by means of valves 3.12, 3.13, 3.22 and 3.23. The two left-hand valves 3.13 and 3.12 according to the representation shown in FIG. 2 are allocated to a first solvent condenser 3.1 and the two right-hand valves 3.22 and 3.23 according to the representation of FIG. 2 are allocated to a second solvent condenser 3.2. The mixture consisting of solvent/nitrogen is fed into this circuit between the two valve groups; furthermore, each solvent condenser 3.1 and 3.2 is connected to the circuit between its two associated valves.

Between the two solvent condensers 3.1 and 3.2 there is provided a liquid separator 3.6 effective in both flow directions of the gas mixture, which collects any condensing solvent. Said liquid separator 3.6 is connected to the two condensers 3.1 and 3.2.

The outlets of the two solvent condensers 3.1 and 3.2 are connected to each other and to the refrigerant vaporizer 3 of the refrigerating machine 4. A pump 3.5 sucks off the liquid refrigerant from the refrigerant vaporizer 3 and feeds it to the solvent condenser 3.2 via a valve 3.21 or to the solvent condenser 3.1 via a valve 3.11, respectively.

The two-phase mixture consisting of liquid solvent/purified nitrogen flows to the separator 5, where it is further processed in the manner described above.

Of the two solvent condensers 3.1 and 3.2 one is in operation at a time, while the other one is being defrosted.

If, for instance, the solvent condenser 3.1 is defrosted, valve 3.11 is closed, so that the pump 3.5 supplies only the solvent condenser 3.2 with liquid refrigerant from the refrigerant vaporizer 3 via the opened valve 3.21. At the same time valves 3.12 and 3.23 are opened and valves 3.22 and 3.13 are closed, so that the solvent condenser 3.1 is supplied with carrier gas and thus receives the enthalpy necessary for its defrosting.

The carrier gas then flows via the liquid separator into the operating solvent condenser 3.2 and, furthermore, via the opened valve 3.23 to the liquid separator 5, where further processing takes place as usual.

For inverting this function valve 3.11 is opened, valve 3.21 is closed and valves 3.12, 3.13, 3.22 and 3.23 are switched over accordingly, so that the solvent condenser 3.2 is defrosted and at the same time the solvent condenser 3.1 is operated.

Due to this "tandem method" the refrigerant vaporizer 3 is separated from the solvent condensers and it is simultaneously guaranteed that due to regular defrosting without interruption, any possible solidifying of solvents cannot lead to operating troubles.

We claim:

1. Solvent condenser arrangement for a solvent recovery apparatus, wherein
    at least two solvent condensers are provided, of which one is in operation at a time, while the other one is defrosted, and wherein
    the at least two solvent condensers are supplied alternately via a pump from a refrigerant container under vaporization pressure.

2. Solvent condenser arrangement according to claim 1, in which the refrigerant vaporizer of a refrigerating machine serves as refrigerant container.

3. Solvent condenser arrangement according to claim 1, in which the direction of the flow of a carrier gas charged with solvent through the solvent condensers is switched simultaneously with the change between defrosting and condensing.

4. Solvent condenser arrangement according to claim 1, in which a liquid separator effective in both flow directions is arranged between the solvent condensers.

5. Solvent condenser arrangement according to claim 1, in which the at least two solvent condensers are connected to a precooler via valves.

6. Solvent condenser arrangement according to claim 1, in which the refrigerant container is connected to the solvent condensers via valves.

7. Solvent condenser arrangement according to claim 5, in which the valves can be operated groupwise.

8. Solvent condenser arrangement according to claim 6, in which the valves can be operated groupwise.

* * * * *

UNITED STATES PATENT AND TRADEMARK OFFICE
CERTIFICATE OF CORRECTION

PATENT NO. : 5,083,440
DATED : January 28, 1992
INVENTOR(S) : Michael Karthaus, et. al.

It is certified that error appears in the above-indentified patent and that said Letters Patent is hereby corrected as shown below:

On the Title page, item [73], Assignee, should read as follow:

--Herco-Kuhltechnik & Co GmbH and Air Products Gmbh, Werk Hattingen,

Federal Republic of Germany--.

Signed and Sealed this

Sixth Day of July, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,083,440
DATED : January 28, 1992
INVENTOR(S) : Michael Karthaus, et al It is certified that error appears in the above-indentified patent and that said Letters Patent is hereby corrected as shown below:

On the title page, item (73) Assignee, should read as follows:
        --Herco-Kühltechnik Hermanns & Co., GmbH and
        Air Products GmbH, Werk Hattingen, Federal
        Republic of Germany--.

Signed and Sealed this

Twelfth Day of April, 1994

Attest:

BRUCE LEHMAN

Attesting Officer

Commissioner of Patents and Trademarks